US 12,359,605 B1

(12) United States Patent
Chang

(10) Patent No.: US 12,359,605 B1
(45) Date of Patent: Jul. 15, 2025

(54) SYSTEMS AND METHODS FOR IN-CYLINDER ENGINE PRESSURE SENSOR COOLING

(71) Applicant: Caterpillar Inc., Peoria, IL (US)

(72) Inventor: David Y. Chang, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/774,106

(22) Filed: Jul. 16, 2024

(51) Int. Cl.
| F01P 1/06 | (2006.01) |
| F02D 35/02 | (2006.01) |
| F02D 41/00 | (2006.01) |
| G01L 23/28 | (2006.01) |

(52) U.S. Cl.
CPC .............. F01P 1/06 (2013.01); F02D 35/023 (2013.01); F02D 41/0025 (2013.01); G01L 23/28 (2013.01); *F02D 2200/0611* (2013.01)

(58) Field of Classification Search
CPC .. F02D 35/022; F02D 35/023; F02D 41/0025; F02D 41/28; F02D 2200/0602; F01P 1/06; G01L 9/0077; G01L 23/06; G01L 23/16; G01L 23/22; G01L 23/28
See application file for complete search history.

(56) References Cited

U.S. PATENT DOCUMENTS

| 6,622,549 | B1 * | 9/2003 | Wlodarczyk | ......... | G01J 5/0893 |
| | | | | | 73/114.51 |
| 7,849,833 | B2 | 12/2010 | Toyoda | | |
| 9,587,612 | B2 | 3/2017 | Akazaki et al. | | |
| 2004/0045283 | A1 * | 3/2004 | Asada | ................ | F02D 41/0002 |
| | | | | | 60/285 |
| 2009/0217913 | A1 * | 9/2009 | Toyoda | .................. | F02M 61/14 |
| | | | | | 123/193.2 |
| 2016/0340012 | A1 * | 11/2016 | Yamada | ................. | B63H 20/28 |
| 2019/0277210 | A1 * | 9/2019 | Akazaki | ............... | F02D 35/024 |

FOREIGN PATENT DOCUMENTS

| CN | 205317403 U | 6/2016 |
| CN | 209910859 U | 1/2020 |
| CN | 106706204 B | 6/2022 |
| CN | 220018807 U | 11/2023 |
| JP | 05312096 A | 11/1993 |
| JP | 2016142603 A | 8/2016 |

* cited by examiner

*Primary Examiner* — Logan M Kraft
*Assistant Examiner* — Johnny H Hoang
(74) *Attorney, Agent, or Firm* — Bookoff McAndrews, PLLC

(57) ABSTRACT

An engine system includes an air intake system, an engine cylinder, a piston, an exhaust system, and an in-cylinder pressure sensor fluidly connected to the engine cylinder. The piston is movable within the engine cylinder during a combustion cycle, and the engine cylinder is fluidly connected to the air intake system via an intake port and an intake valve. The exhaust system is fluidly connected to the engine cylinder via an exhaust port and an exhaust valve. The in-cylinder pressure sensor is fluidly connected to the air intake system via an in-cylinder pressure sensor cooling line.

20 Claims, 5 Drawing Sheets

SYSTEMS AND METHODS FOR IN-CYLINDER ENGINE PRESSURE SENSOR COOLING

TECHNICAL FIELD

This disclosure relates generally to systems and methods for internal combustion engines, and more particularly, to systems and methods for in-cylinder engine pressure sensor cooling for an internal combustion engine.

BACKGROUND

Internal combustion engines are useful in a variety of different situations and in differing types of machines. For example, internal combustion engines are used to generate power for mobile machines, vehicles, and mobile or stationary power generation systems, to name a few. While some engines use only liquid fuel (e.g., either gasoline or diesel fuel), some engines are capable of operating with a gaseous fuel, either alone or in combination with a liquid fuel. Some engines, sometimes referred to as "dual fuel" engines, can operate by injecting two different types of fuel in a single combustion cycle, such as diesel fuel injected to generate a pilot flame and a gaseous fuel (e.g., natural gas) injected as a primary fuel. Gaseous fuel engines, including some spark-plug equipped dual fuel engines, are able to combust one or more types of gaseous fuels, including natural gas, methane, and others. Many of these engines include one or more sensors in or otherwise exposed to a combustion chamber, for example, pressure sensors. For example, the pressure sensors may be connected (e.g., via one or more wired or wireless connections) to one or more controllers, and may be used to help control the combustion cycle, mixing of gases (e.g., in dynamic gas blending mode), etc. However, the combustion chamber undergoes high temperatures or pressures (e.g., as a result of fuel burn or power cycles). The high temperatures or pressures may damage or reduce the usable life of the one or more pressure sensors, for example, by bending, deforming, or otherwise damaging one or more portions of the pressure sensors (e.g., one or more membranes or welds of the pressure sensors).

A pressure sensor cooling device for an internal combustion engine is described in CN Publication No. 220018807 U ("the '807 publication") to Zhu et al. The device described in the '807 publication involves a housing portion of the pressure sensor including a plurality of air film holes. The plurality of air film holes allow for a small amount of a cooling medium to enter a cavity within the pressure sensor to help cool the pressure sensor. While the device described in the '807 publication may be useful to help cool a pressure sensor in some instances, the device may be difficult or costly to implement on an engine. Additionally, the device of the '807 publication may require modifications to existing pressure sensors or engines to implement.

The techniques of this disclosure may solve one or more of the problems set forth above or other problems in the art. The scope of the current disclosure, however, is defined by the attached claims, and not by the ability to solve any specific problem.

SUMMARY

In one aspect, an engine system may include an air intake system, an engine cylinder, a piston, an exhaust system, and an in-cylinder pressure sensor fluidly connected to the engine cylinder. The piston may be movable within the engine cylinder during a combustion cycle, and the engine cylinder may fluidly connected to the air intake system via an intake port and an intake valve. The exhaust system may be fluidly connected to the engine cylinder via an exhaust port and an exhaust valve. The in-cylinder pressure sensor may be fluidly connected to the air intake system via an in-cylinder pressure sensor cooling line.

In another aspect, a method for performing a combustion cycle may include performing an intake stroke of a combustion cycle of a combustion engine and cooling or reducing a pressure of or around an in-cylinder pressure sensor, performing an exhaust stroke of the combustion cycle, and repeating the intake stroke to again draw air in from the air intake system to the sensor cavity. The combustion engine may include an engine cylinder housing a movable piston. The combustion engine may also include an air intake system and an exhaust system. The in-cylinder pressure sensor may be housed in a sensor cavity that is fluidly connected to the engine cylinder. Movement of the piston during the intake stroke may cause a one way check valve to open in a cooling line system to draw air in from the air intake system to the sensor cavity.

In yet another aspect, an engine system may include an air intake system, an engine cylinder, a piston, a fuel injector configured to inject a first fuel into the engine cylinder, an exhaust system, a source of a second fuel fluidly connected to the air intake via a fuel valve to deliver a second fuel into the engine cylinder, and an in-cylinder pressure sensor fluidly connected to the engine cylinder. The piston may be movable within the engine cylinder during a combustion cycle. The engine cylinder may be fluidly connected to the air intake system via an intake port and an intake valve. The exhaust system may be fluidly connected to the engine cylinder via an exhaust port and an exhaust valve. The in-cylinder pressure sensor may be fluidly connected to the air intake system via an in-cylinder pressure sensor cooling line.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of +10% in the stated value or characteristic. As used herein, the phrase "based on" is understood to be equivalent to the phrase "based at least on," unless indicated otherwise. The term "or" is used disjunctively, such that "at least one of A or B" includes, (A), (B), (A and A), (A and B), etc.

Figure 1:
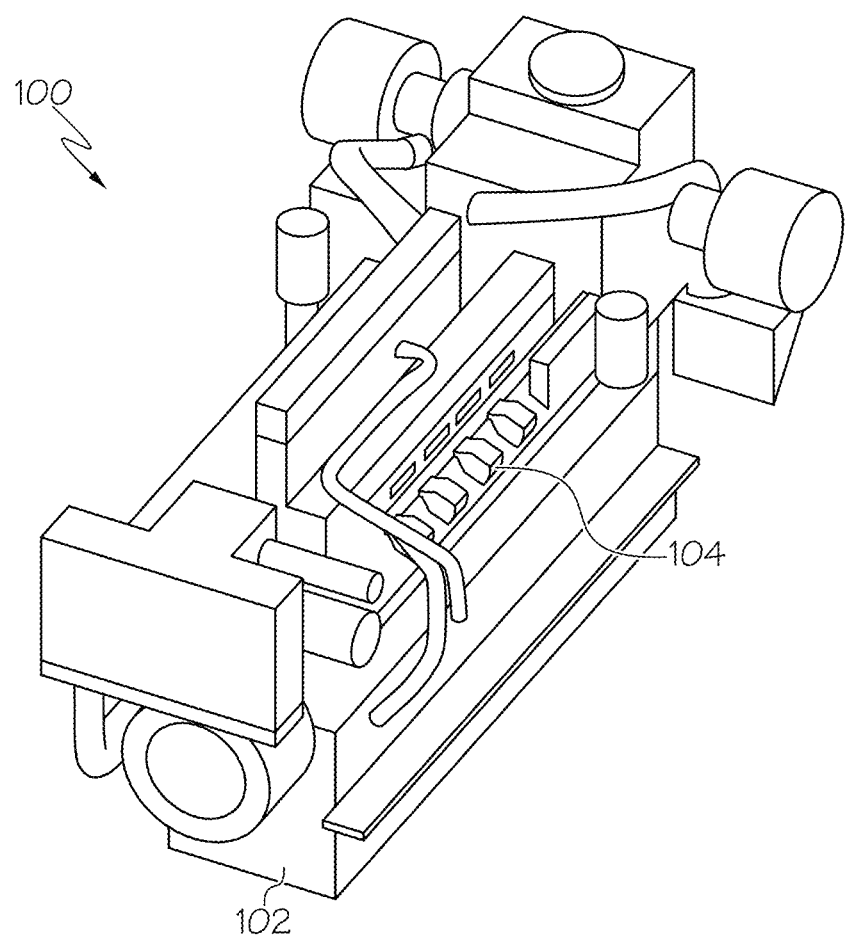
FIG. 1 is a perspective view of an exemplary engine, according to aspects of the disclosure.
Figure 2:
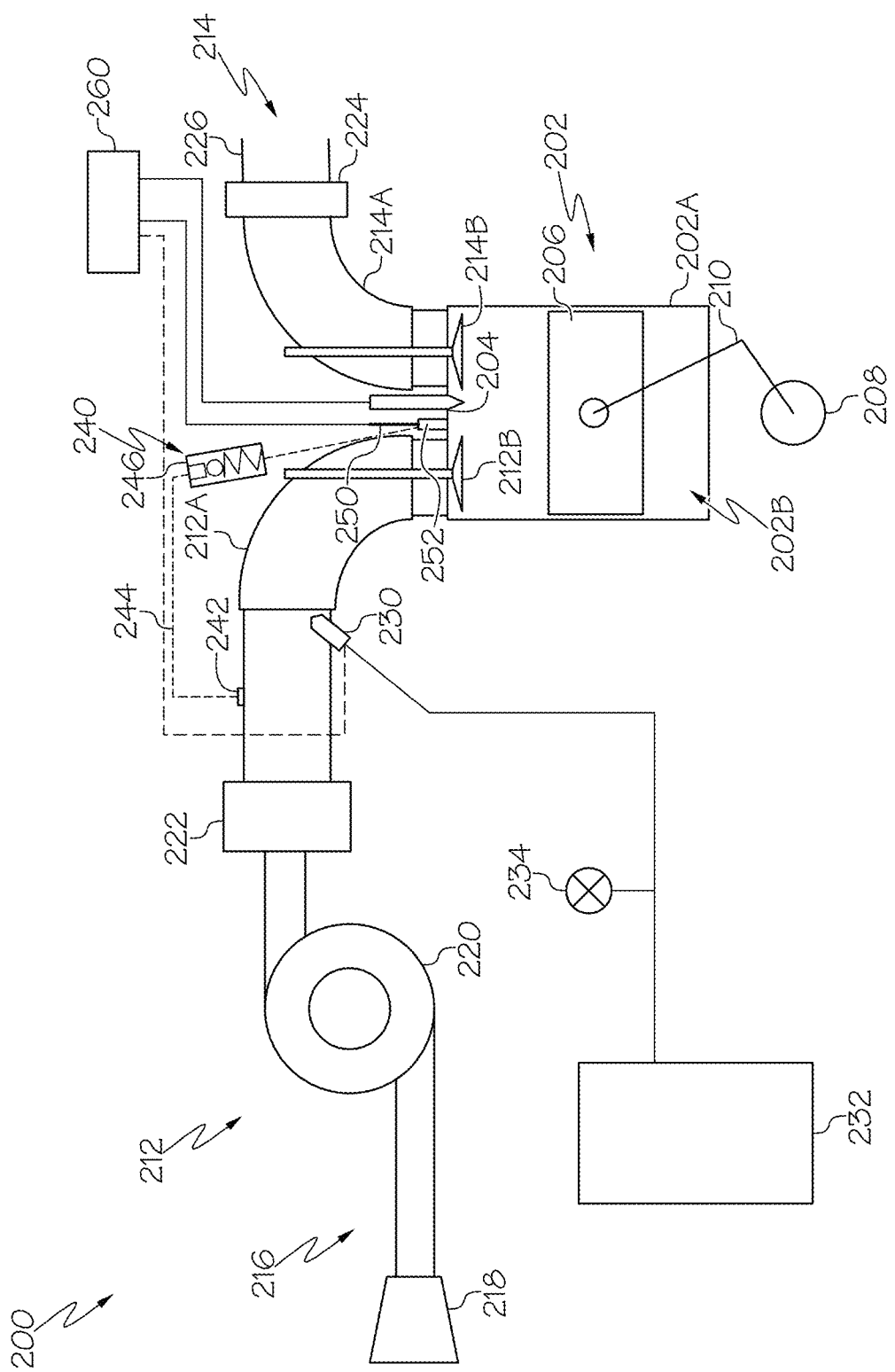
FIG. 2 is a schematic representation of an exemplary engine system, including at least one in-cylinder pressure sensor.

FIG. 1 illustrates an exemplary engine system 100. Engine system 100 may be an internal combustion engine, for example, powered by one or more fuels, such as natural gas, diesel fuel, or a combination thereof. More specifically, in the illustrated embodiment, engine system 100 may be a Direct Injected Gas (DIG) engine. As such, engine system 100 may employ two fuels for combustion, for example, a combination of natural gas and diesel fuel. The natural gas and diesel fuel may be simultaneously or sequentially injected into an engine cylinder 202 (shown in FIG. 2) of engine system 100, based on application requirements, in a ratio of up to 99:1 or the ratio may vary based on application requirements. The fuels may be directly injected into cylinder 202, for example, by a fuel injector 204 (shown in FIG. 2) or indirectly injected or otherwise delivered into cylinder 202. Engine system 100 may include a plurality of cylinders 202 that define a respective number of combustion chambers. While only cylinder 202 is shown in FIG. 2, engine system 100 may contain any number of cylinders, including two, four, five, six, eight, ten, twelve, twenty, or more. Pistons of each cylinder may be connected to a crankshaft (e.g., a common crankshaft) for transferring power to a generator, a transmission, or other device.

As discussed in detail below, engine system 100 may include one or more pressure sensors, for example, one or more in-cylinder pressure sensors 250 (FIG. 2). As the fuel(s) combust within cylinder 202, the temperature or pressure may increase, which may potentially damage or otherwise negatively affect in-cylinder pressure sensor 250. The one or more in-cylinder pressure sensors 250 may be fluidly connected (e.g., selectively connected) to one or more sources of cool air, for example, to help reduce the temperature of in-cylinder pressure sensor(s) 250 or the pressure around in-cylinder pressure sensor(s) 250.

Engine system 100 may be configured to receive gaseous fuel from a gaseous fuel source (not shown). In a dual-fuel configurations, engine system 100 may be configured to receive a liquid fuel from a pilot fuel source. As used herein, a "gaseous fuel" includes fuels that are supplied to a fuel injector in a gaseous form. Thus, the term "gaseous fuel" includes fuels stored in gaseous form, liquid form, or a mixture of gaseous and liquid forms, while present in a fuel tank or other storage device. Exemplary gaseous fuels include, but are not limited to, natural gas, methane, propane, hydrogen, and blends thereof. As used herein, a "liquid fuel" includes fuels that are supplied to a fuel injector in a liquid form. Exemplary liquid fuels include, but are not limited to, diesel fuel, ethanol, methanol, or gasoline.

It is noted that, in some aspects, engine system 100 may only employ a single fuel for combustion, such as natural gas or diesel fuel based on application requirements. The single fuel may be directly or indirectly injected into cylinder 202 of engine system 100 by any fuel injector or valve known in the art and based on application requirements. In some aspects, one or more fuels may be indirectly injected into cylinder 202, for example, by one or more valves. In such aspects, engine system 100 may include one or more spark plugs (not shown). In any of these aspects, engine system 100 may be used for applications including, but not limited to, power generation, transportation, construction, agriculture, forestry, aviation, marine, material handling, or waste management.

As shown in FIG. 1, engine system 100 includes an engine block 102. Engine block 102 includes one or more cylinders 202 (FIG. 2) provided therein. Cylinders 202 may be arranged in any configuration, for example, such as inline, radial, "V", etc. Engine system 100 also includes one or more cylinder heads 104 mounted on engine block 102. Cylinder head 104 houses one or more components or systems (not shown) of engine system 100, such as a valve train, an intake manifold, an exhaust manifold, sensors, and so on. Additionally, engine system 100 may include various other components or systems (not shown) such as a crankcase, a fuel system, an air system, a cooling system, a turbocharger, an exhaust gas recirculation system, an exhaust aftertreatment system, other peripheries, etc.

FIG. 2 is a schematic illustration of an exemplary combustion engine 200, for example, including cylinder 202. Engine system 100 (FIG. 1) may include one or more combustion engines 200. Cylinder 202 may include a cylinder body 202A forming a cylinder cavity 202B, and a piston 206 may be movable within cylinder cavity 202B. Piston 206 may be movable via a crankshaft 208 and a movable linkage, arm, or rod 210, for example, to compress or combust one or more fuels within cylinder 202.

Cylinder body 202A may include or be connected to an intake system 212 (e.g., an air intake system) and an exhaust system 214. Intake system 212 may include an intake port 212A, which may be fluidly connected to cylinder 202 via one or more intake valves 212B. Exhaust system 214 may include an exhaust port 214A, which may be fluidly connected to cylinder 202 via one or more exhaust valves 214B. Intake valve(s) 212B and exhaust valve(s) 214B may be selectively opened and closed during different portions of the combustion cycle. Intake system 212 may receive air (e.g., oxygen) via one or more air intakes 216, for example, including one or more air filters 218, one or more turbochargers 220, or one or more after coolers 222. Additionally, exhaust system 214 may include one or more aftertreatment systems 224 or one or more exhaust pipes 226, for example, to treat or release one or more gases emitted by cylinder 202.

As mentioned above, combustion engine 200 may include one or more fuel injectors 204, for example, adjacent to intake valve 212B or exhaust valve 214B. In some aspects, fuel injector 204 may be a diesel fuel injector. In other aspects, fuel injector 204 may inject or otherwise deliver one or more other fuels into cylinder 202. In any of these aspects, fuel injector 204 may be fluidly connected to one or more sources of fuel (e.g., a storage device, tank, etc.). Fuel injector 204 may be a direct injector, a port injector, etc. Furthermore, in other aspects, although not shown, combustion engine 200 may include one or more pilot lights, spark plugs, etc. to help ignite or combust the one or more fuels.

Additionally, in some aspects, combustion engine 200 may receive one or more other fuels. For example, combustion engine 200 may include one or more fuel valves 230 coupled to one or more portions of intake system 212. Fuel valve 230 may be fluidly connected to intake system 212 at a position between after cooler 222 and intake port 212A (e.g., adjacent to or otherwise upstream of intake port 212A). Fuel valve 230 may be fluidly connected to a source of fuel 232, for example, via one or more regulators 234. Source of fuel 232 may be a storage device, tank, etc. that may contain a different (e.g., a different chemical composition or phase) fuel than the fuel injected by fuel injector 204. For example, as mentioned above, source of fuel 232 may contain natural gas, and fuel injector 204 may inject diesel fuel. Nevertheless, in some aspects, combustion engine 200 may only receive and combust a single fuel, for example, by not including fuel valve 230, source of fuel 232, and regulator 234. In another aspect, combustion engine 200 may only receive and combust a single fuel, for example, by not including fuel injector 204.

As mentioned above, combustion engine 200 may include one or more pressure sensors, for example, at least one in-cylinder pressure sensor 250. Moreover, in-cylinder pressure sensor 250 may be positioned within or adjacent to cylinder 202. In these aspects, in-cylinder pressure sensor 250 may be fluidly connected to cylinder cavity 202B. For example, cylinder 202 may include or otherwise be coupled to a sensor opening, hole, or cavity (e.g., sensor cavity 252). In these aspects, in-cylinder pressure sensor 250 may be positioned in sensor cavity 252, and sensor cavity 252 may be fluidly connected to cylinder cavity 202B, such that in-cylinder pressure sensor 250 may detect a pressure of cylinder 202.

Additionally, in-cylinder pressure sensor 250 or sensor cavity 252 may be fluidly connected to one or more portions of intake system 212. For example, combustion engine 200 may include or otherwise be coupled to a cooling line system 240, which may fluidly connect in-cylinder pressure sensor 250 or sensor cavity 252 to one or more portions of intake system 212. Cooling line system 240 may include a cooling line intake 242, which may be coupled to one or more portions of intake system 212. For example, cooling line intake 242 may be coupled to a portion of intake system 212 positioned between after cooler 222 and intake port 212A. In some aspects, cooling line intake 242 coupled to intake system 212 at a position upstream of where fuel valve 230 is coupled to intake system 212. For example, cooling line intake 242 may be coupled to intake system 212 at a position closer to after cooler 222, and fuel valve 230 may be coupled to intake system 212 at a position closer to intake port 212A. Additionally, cooling line system 240 may include one or more tubes, pipes, or other conduits 244, fluidly connecting cooling line intake 242 to in-cylinder pressure sensor 250 or sensor cavity 252.

Cooling line system 240 may also include one or more valves, for example, one or more check valves 246. For example, check valve(s) 246 may be positioned along or within a portion of conduit(s) 244 between cooling line intake 242 and in-cylinder pressure sensor 250 or sensor cavity 252. Check valve(s) 246 may each be a one way valve, for example, only allowing air to flow through check valve 246 in a direction from cooling line intake 242 to in-cylinder pressure sensor 250 or sensor cavity 252, but not in a direction from in-cylinder pressure sensor 250 or sensor cavity 252 toward cooling line intake 242.

Additionally, in some aspects, check valve(s) 246 only allow air to flow through toward in-cylinder pressure sensor 250 or sensor cavity 252 when a pressure on the downstream side of check valve(s) 246 is lower than a pressure on the upstream side of check valve(s) 246. For example, the pressure on the downstream side of check valve(s) 246 may be the pressure around in-cylinder pressure sensor 250, within sensor cavity 252, or within cylinder cavity 202B. The pressure on the upstream side of check valve(s) 246 may be the pressure of air intake system 212. In some aspects, the pressure on the downstream side of check valve(s) 246 may only be lower than the pressure on the upstream side of check valve(s) 246 during an intake stroke portion of a combustion cycle of cylinder 202. For example, the intake stroke portion of the combustion cycle of cylinder 202 may include piston 206 moving downward (relative to the orientation of FIG. 2, and as controlled by crankshaft 208). In these aspects, the movement of piston 206 in the intake stroke portion of the combustion cycle of cylinder 202 may draw air into cylinder cavity 202B, both via intake port 212A and via cooling line system 240. The air flowing through cooling line system 240 may thus flow through cooling line intake 242, conduit 244, and check valve 246, and then into sensor cavity 252 and around in-cylinder pressure sensor 250 (e.g., forming an in-cylinder pressure sensor cooling line). The air flowing through cooling line system 240 may bring in air (e.g., fresh or cold air) to help cool the temperature of in-cylinder pressure sensor 250 or reduce the pressure of sensor cavity (and thus reduce the pressure(s) around in-cylinder pressure sensor 250). Additionally, the air flowing through cooling line system 240 may help to purge out or otherwise expel uncombusted fuel (e.g., unburned natural gas) from sensor cavity 252 and around in-cylinder pressure sensor 250. Moreover, in some aspects, the air flowing through cooling line system 240 may help to purge out or otherwise expel combusted or burned hot gas(es) from sensor cavity 252 and around in-cylinder pressure sensor 250.

Combustion engine 200 may include or be coupled to (e.g., via one or more wired or wireless connections) one or more processors or controllers, for example, at least one controller or electronic control module (ECM) 260. For example, ECM 260 may be connected to one or more of fuel injector 204, fuel valve 230, in-cylinder pressure sensor 250, or one or more other components of combustion engine 200. ECM 260 may receive one or more signals, for example, indicated of a pressure within cylinder cavity 202B from in-cylinder pressure sensor 250. Additionally, or alternatively, ECM 260 may emit or otherwise output one or more signals to one or more components of combustion engine 200. For example, ECM 260 may output one or more signals to control the timing or functionality of one or more fuel injector 204, fuel valve 230, etc. In these aspects, ECM 260 may help to control the delivery of one or more fuels (e.g., diesel fuel via fuel injector 204, natural gas via fuel valve 230, etc.) or air into cylinder 202. Although not shown, ECM 260 may include or otherwise be coupled to one or more memories, displays, user interfaces, for example, to store, display, or receive inputs related to one or more aspects of combustion engine 200.

ECM 260 may be a control module that controls one or more aspects of engine system 100, for example, including combustion engine 200. ECM 260 may be a single controller configured to control engine system 100. If desired, ECM 260 may be a single controller dedicated to one or more aspects of engine system 100 or combustion engine 200. As used herein the term "controller," while singular, includes both a single controller and multiple controllers that operate with engine system 100. Thus, ECM 260 may be implemented as a plurality of distributed control modules in communication with each other. ECM 260 may be enabled, via programming, to receive inputs (e.g., from in-cylinder pressure sensor 250) generate outputs (e.g., to control one or more of fuel injector 204, fuel valve 230, etc.).

ECM 260 may embody a single microprocessor or multiple microprocessors that receive inputs or generate outputs. ECM 260 may include a memory, as well as a secondary storage device, a processor, such as a central processing unit, or any other means or devices for accomplishing a task consistent with this disclosure. The memory or secondary storage device associated with ECM 260 may store data and software to allow ECM 260 to perform its functions, including the functions described herein. In particular, the memory for ECM 260 may store instructions that, when executed by one or more processors, enable these processors to perform one or more of the functions described herein. Numerous commercially available microprocessors can be configured to perform the functions of ECM 260. Various other known circuits may be associated with ECM 260, including signal-conditioning circuitry, communication circuitry, and other appropriate circuitry.

Figure 3:
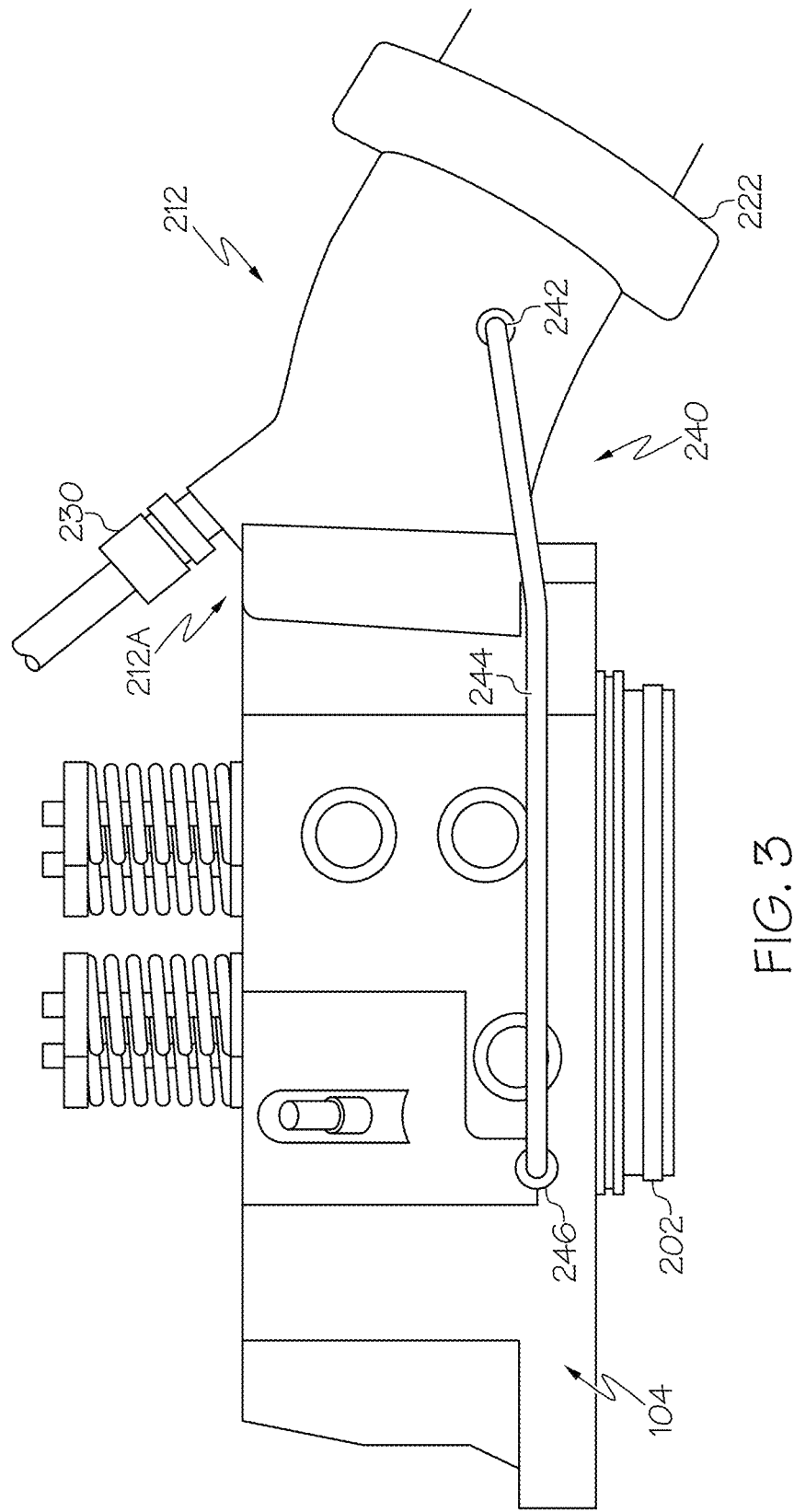
FIG. 3 is a side view of a portion of the exemplary engine system.

FIG. 3 is a side view of a portion of the engine system or combustion engine discussed above. Specifically, FIG. 3 illustrates a portion of cylinder 202, a portion of intake system 212, and a portion of cooling line system 240. As shown, a portion of cooling line system 240 is coupled to a portion of intake system 212. For example, as mentioned, cooling line intake 242 may be coupled to a portion of intake system 212 at a position adjacent or just downstream of after cooler 222. Additionally, if engine system 100 or combustion engine 200 includes a secondary fuel source (e.g., coupled to intake system 212 via fuel valve 230), then cooling line intake 242 may be coupled to the portion of intake system 212 at a position upstream of the position where intake system 212 is coupled to fuel valve 230.

Moreover, cooling line system 240 includes conduit 244 extending from cooling line intake 242. Conduit 244 may extend to a portion of cylinder head 104, for example, to fluidly connect intake system 212 to in-cylinder pressure sensor 250 or sensor cavity 252. For example, conduit 244 may extend to check valve 246, which opens or closes to selectively fluidly connect in-cylinder pressure sensor 250 or sensor cavity 252 to air (e.g., fresh or cold air) from air intake system 212 to help cool in-cylinder pressure sensor 250 (FIG. 4).

Figure 4:
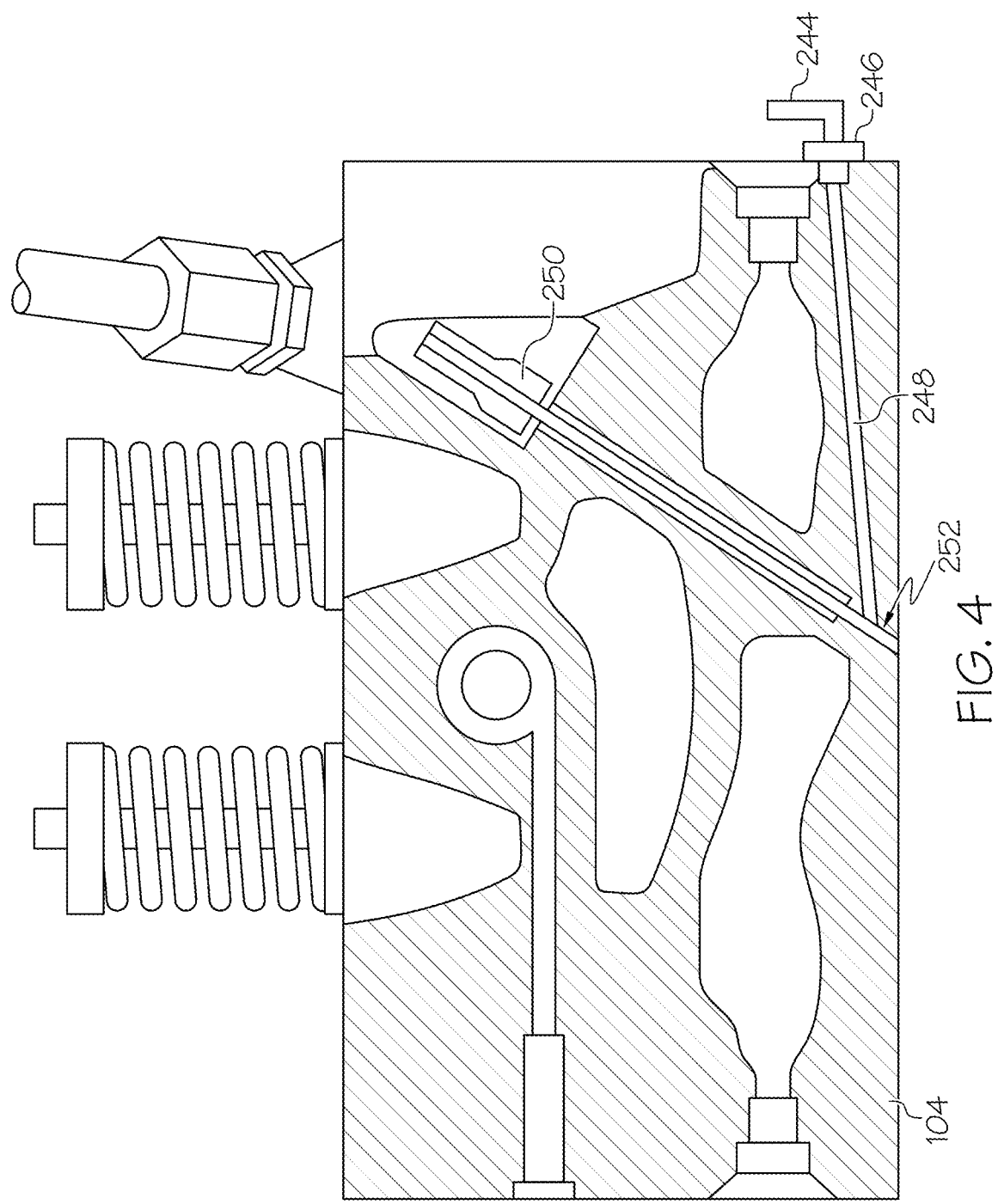
FIG. 4 is a partial cross-sectional view of another portion of the exemplary engine system.

FIG. 4 illustrates a partial cross-sectional view of another portion of the exemplary engine system. As shown, a portion of cylinder head 104 is coupled to sensor cavity 252, for example, housing in-cylinder pressure sensor 250. Additionally, sensor cavity 252 may be fluidly connected to one or more portions of intake system 212 (FIG. 2). For example, conduit 244 may extend to a portion of cylinder head 104, for example, via check valve 246. Additionally, cylinder head 104 (or another portion of combustion engine 200) may include a cooling air conduit 248, for example, fluidly connecting check valve 246 to sensor cavity 252. In these aspects, when check valve 246 is open, cool or fresh air may flow from conduit 244, through check valve 246, and through cooling air conduit 248 to sensor cavity 252 to help cool in-cylinder pressure sensor 250. The air flowing through cooling line system 240 to sensor cavity 252 may also help to purge out or otherwise expel uncombusted fuel (e.g., unburned natural gas) or combusted or burned hot gas(es) from sensor cavity 252 and around in-cylinder pressure sensor 250.

INDUSTRIAL APPLICABILITY

Engine system 100, including combustion engine 200 with in-cylinder pressure sensor 250 and cooling line system 240, may be installed with any internal combustion engine system in which it is desirable to help cool or reduce a pressure of or around an in-cylinder sensor. Examples of suitable internal combustion engines include engines used for generating power in a stationary machine (e.g., a generator or other electricity-generating device), in a mobile machine (e.g., an earthmoving device, a hauling truck, a drilling machine, a vehicle, etc.), or in other applications in which it may be beneficial to operate an engine, including engines configured to use with a single fuel or with multiple fuels. Additionally, in some aspects, cooling line system 240 may be coupled to an existing combustion engine 200 with in-cylinder pressure sensor 250, for example, retrofitting an existing system, to help reduce the temperature or pressure of in-cylinder pressure sensor 250.

Figure 5:
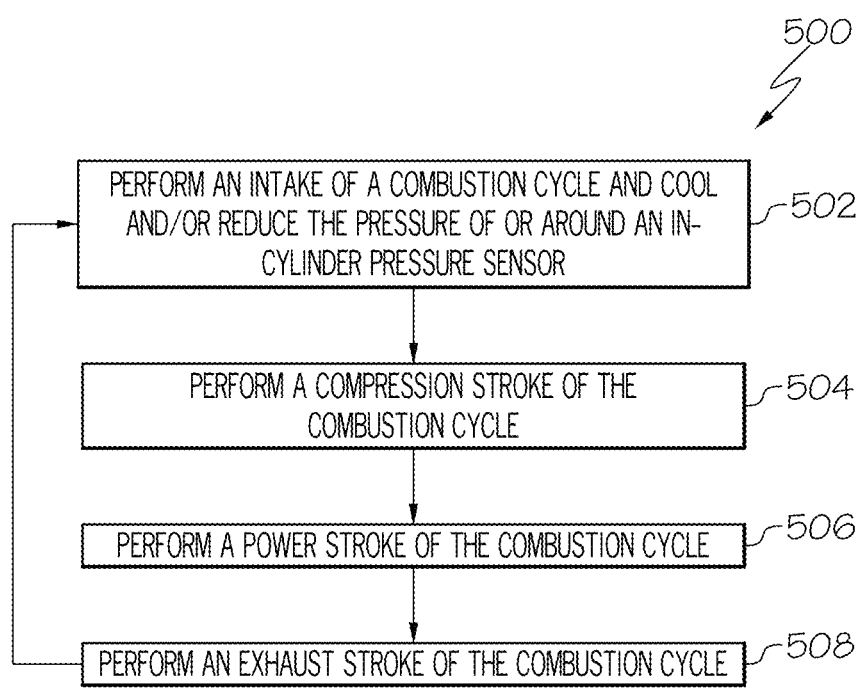
FIG. 5 is a flow chart depicting an exemplary method for operating a combustion engine and for reducing the temperature or pressure of an in-cylinder pressure sensor, according to aspects of this disclosure.

FIG. 5 illustrates a flow chart of an exemplary method 500 for operating a combustion engine and for cooling or reducing the temperature of an in-cylinder pressure sensor. Method 500 may be performed during the operation of combustion engine 200 to help cool or reduce the temperature or pressure of in-cylinder pressure sensor 250. Method 500 may help to perform one or more combustion cycles (e.g., one or more four-stroke combustion cycles), while also helping to cool or reduce the pressure of in-cylinder pressure sensor 250. In other examples, aspects of this disclosure may be used in other engines or other combustion cycles, for example, a two-stroke combustion cycle. As discussed below, the steps or stages of method 500 may be repeated throughout operation of engine system 100 or combustion engine 200.

Initially, a step 502 includes a performing an intake stroke of a combustion cycle and cooling or reducing the pressure of or around an in-cylinder pressure sensor. The intake stroke may include piston 206 moving downward (in FIG. 2) within cylinder cavity 202B to draw in air or fuel from intake system 212, as discussed above. For example, intake valve 212B may be open (e.g., as controlled by ECM 260) during the intake stroke, and air from intake system 212 may flow into cylinder 202. In some aspects, step 502 may include opening fuel valve 230 (e.g., as controlled by ECM 260), such that fuel (e.g., natural gas) from source of fuel 232 may also flow through intake system 212 and into cylinder 202.

Additionally, as discussed above, the intake stroke may also draw in air from intake system into sensor cavity 252 via cooling line system 240. Specifically, the pressure differential caused by the movement of piston 206 may cause check valve 246 to open to allow air to flow from conduit 244 and cooling air conduit 248 to sensor cavity 252. Additionally, the air drawn into sensor cavity 252 may be taken from a portion of intake system 212 that is upstream (or before) the addition of one or more fuels (e.g., from fuel valve 230).

Next, method 500 may include a step 504, which includes performing a compression stroke of the combustion cycle. Step 504 may include piston 206 moving upward (FIG. 2) within cylinder 202, for example, based on the movement of crankshaft 208. Intake valve 212B and exhaust valve 214B may both be closed in step 504 (e.g., as controlled by ECM 260). Step 504 may include compressing the air or fuel within cylinder 202, which may increase the temperature or pressure of or around in-cylinder pressure sensor 250. Additionally, check valve 246 may be closed during the compression stroke.

Method 500 may also include a step 506, which includes performing a power stroke of the combustion cycle. Step 506 may include piston 206 moving downward (FIG. 2) within cylinder 202. Intake valve 212B and exhaust valve 214B may both be closed in step 506 (e.g., as controlled by ECM 260). Step 506 may include ignited or otherwise hot gases forcing piston 206 away from the head of cylinder 202, for example, such that piston 206 applies force to rod 210, which in turn applies torque to crankshaft 208. Step 506 may also increase the temperature or pressure of or around in-cylinder pressure sensor 250. Additionally, check valve 246 may be closed during the power stroke.

Method 500 may also include a step 508, which includes performing an exhaust stroke of the combustion cycle. Step 508 may include piston 206 moving upward (FIG. 2) within cylinder 202, for example, based on the movement of crankshaft 208. Exhaust valve 214B may be open during step 508 (e.g., as controlled by ECM 260), such that the air or fuel within cylinder 202 are exhausted or otherwise expelled into exhaust system 214. Additionally, check valve 246 may be closed during the exhaust stroke.

After step 508, method 500 may return to step 502, such that the intake stroke and the other steps of the combustion cycle may be performed again as many times as needed during the operation of combustion engine 200. Furthermore, as mentioned above, the movement of piston 206 in step 502 may cause check valve 246 to open to allow air to flow from conduit 244 and cooling air conduit 248 to sensor cavity 252, for example, to help reduce the temperature or pressure of or around in-cylinder pressure sensor 250 during the intake stroke.

It is noted that, in some aspects, method 500 may include fewer or more steps. For example, in some aspects, combustion engine 200 may be a two-stroke engine, that is, including with a compression/exhaust stroke and a power/exhaust/intake stroke. Nevertheless, the power/exhaust/intake stroke in a two-stroke engine may also cause check valve 246 to open to allow air to flow from conduit 244 and cooling air conduit 248 to sensor cavity 252, and thus help to cool or reduce the pressure of or around in-cylinder pressure sensor 250.

The steps may be repeated throughout the operation of combustion engine 200. In these aspects, in each intake stroke or step 502, air may be drawn into sensor cavity 252 to help reduce the temperature or pressure of or around in-cylinder pressure sensor 250. Cooling or reducing the pressure of or around in-cylinder pressure sensor 250 may help to prevent cracks, breaking, or other damage to in-cylinder pressure sensor 250 or otherwise help to extend a usable life of in-cylinder pressure sensor.

For example, the air flowing through cooling line system 240 may bring in air (e.g., fresh or cold air) to help cool the temperature of in-cylinder pressure sensor 250 or sensor cavity 252. Additionally, the air flowing through cooling line system 240 may help to purge out or otherwise expel uncombusted fuel (e.g., unburned natural gas) from sensor cavity 252 and around in-cylinder pressure sensor 250. Moreover, in some aspects, the air flowing through cooling line system 240 may help to purge out or otherwise expel combusted or burned hot gas(es) from sensor cavity 252 and around in-cylinder pressure sensor 250.

Furthermore, check valve(s) 246 may help to prevent hot air or other gases or fuels flowing upstream or into intake system 212, as check valve(s) 246 only open when the pressure of cylinder cavity 202B or sensor cavity 252 is below the pressure within intake system 212. In these aspects, check valve(s) 246 is only open during at least a portion of the intake stroke of the combustion cycle, and is closes during other stages of a combustion cycle.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. An engine system, the engine system comprising:
    an air intake system;
    an engine cylinder;
    a piston, wherein the piston is movable within the engine cylinder during a combustion cycle, and wherein the engine cylinder is fluidly connected to the air intake system via an intake port and an intake valve;
    an exhaust system, wherein the exhaust system is fluidly connected to the engine cylinder via an exhaust port and an exhaust valve; and
    an in-cylinder pressure sensor fluidly connected to the engine cylinder, wherein the in-cylinder pressure sensor is fluidly connected to the air intake system via an in-cylinder pressure sensor cooling line.

2. The engine system of claim 1, wherein the in-cylinder pressure sensor cooling line includes a check valve.

3. The engine system of claim 2, wherein the check valve is a one way valve that allows air to flow from the air intake system to the in-cylinder pressure sensor during an intake stroke of the combustion cycle for the engine cylinder.

4. The engine system of claim 1, wherein the in-cylinder pressure sensor is fluidly connected to the engine cylinder via an opening in a portion of the engine cylinder.

5. The engine system of claim 1, wherein the air intake system includes an air filter, a turbocharger, and an after cooler, and wherein the in-cylinder pressure sensor cooling line is fluidly connected to the air intake downstream of the after cooler.

6. The engine system of claim 1, further comprising a fuel injector configured to inject a fuel into the engine cylinder.

7. The engine system of claim 6, wherein the fuel is a first fuel, and wherein the engine system further comprises a source of a second fuel fluidly connected to the air intake system, a regulator positioned between the source of the second fuel and the air intake, and a fuel valve fluidly coupling the source of the second fuel and the air intake system.

8. The engine system of claim 7, wherein the source of the second fuel is coupled to the air intake system at a position downstream of a position where the in-cylinder pressure sensor cooling line is coupled to the air intake system.

9. A method for performing a combustion cycle, the method comprising:
    performing an intake stroke of a combustion cycle of a combustion engine and cooling or reducing a pressure of or around an in-cylinder pressure sensor, wherein the combustion engine includes an engine cylinder housing a movable piston, an air intake system, and an exhaust system, wherein the in-cylinder pressure sensor is housed in a sensor cavity that is fluidly connected to the engine cylinder, and wherein movement of the piston during the intake stroke causes a one way check valve to open in a cooling line system to draw air in from the air intake system to the sensor cavity;
    performing an exhaust stroke of the combustion cycle; and
    repeating the intake stroke to again draw air in from the air intake system to the sensor cavity.

10. The method of claim 9, further comprising:
    performing a compression stroke of the combustion cycle; and
    performing a power stroke of the combustion cycle.

11. The method of claim 9, wherein the air intake system includes an air filter, a turbocharger, and an after cooler, and wherein the in-cylinder pressure sensor is fluidly connected to the air intake system downstream of the after cooler via an in-cylinder pressure sensor cooling line.

12. The method of claim 11, wherein the air intake is coupled to a source of fuel, and wherein the source of fuel is coupled to the air intake system at a position downstream of a position where the in-cylinder pressure sensor cooling line is coupled to the air intake system.

13. The method of claim 12, wherein the source of fuel is a source of natural gas, and wherein the engine cylinder is coupled to a fuel injector configured to inject diesel fuel into the engine cylinder.

14. The method of claim 13, wherein delivery of the natural gas and the diesel fuel into the engine cylinder is controlled via an electronic control module, wherein the electronic control module is also connected to the in-cylinder pressure sensor.

15. An engine system, the engine system comprising:
an air intake system;
an engine cylinder;
a piston, wherein the piston is movable within the engine cylinder during a combustion cycle, and wherein the engine cylinder is fluidly connected to the air intake system via an intake port and an intake valve;
a fuel injector configured to inject a first fuel into the engine cylinder;
an exhaust system, wherein the exhaust system is fluidly connected to the engine cylinder via an exhaust port and an exhaust valve;
a source of a second fuel fluidly connected to the air intake via a fuel valve to deliver a second fuel into the engine cylinder; and
an in-cylinder pressure sensor fluidly connected to the engine cylinder, wherein the in-cylinder pressure sensor is fluidly connected to the air intake system via an in-cylinder pressure sensor cooling line.

16. The engine system of claim 15, wherein the source of the second fuel is coupled to the air intake system at a position downstream of a position where the in-cylinder pressure sensor cooling line is coupled to the air intake system.

17. The engine system of claim 15, wherein the in-cylinder pressure sensor cooling line includes or is coupled to a one way check valve.

18. The engine system of claim 15, wherein the air intake system includes an air filter, a turbocharger, and an after cooler, and wherein the in-cylinder pressure sensor cooling line is fluidly connected to the air intake system downstream of the after cooler.

19. The engine system of claim 18, wherein the in-cylinder pressure sensor cooling line is fluidly connected to the air intake system upstream of the fuel valve.

20. The engine system of claim 15, wherein the first fuel is diesel fuel, and wherein the second fuel is natural gas.

* * * * *